May 3, 1966  K. H. KNOWLES  3,249,328
DELAYED ACTION COUPLING DEVICE FOR PARACHUTES
Filed May 26, 1964  2 Sheets-Sheet 1
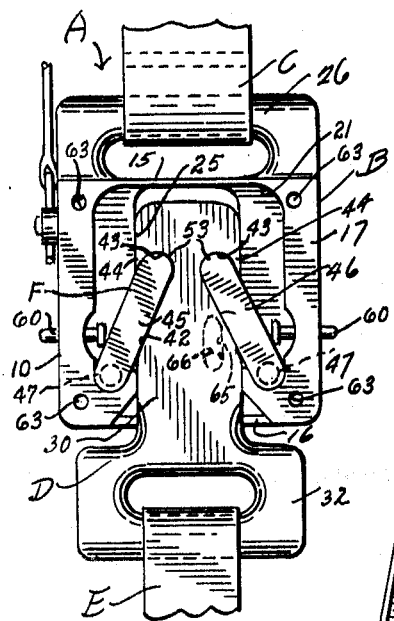
Fig. 3.
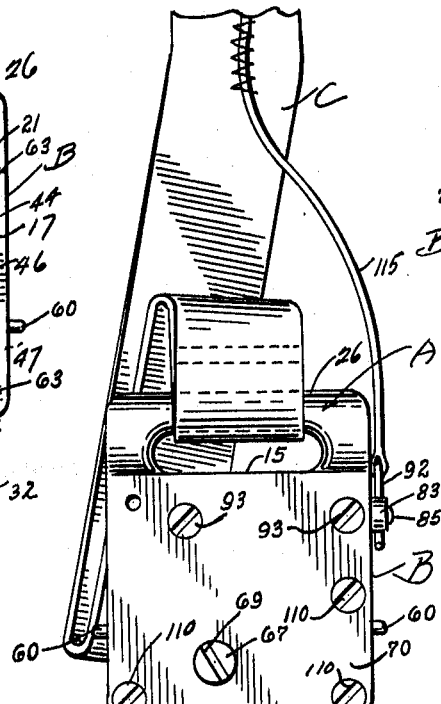
Fig. 1.
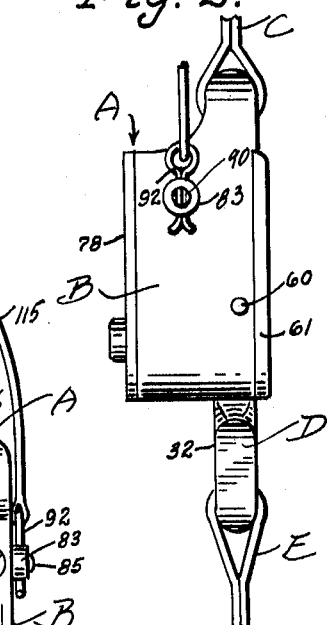
Fig. 2.
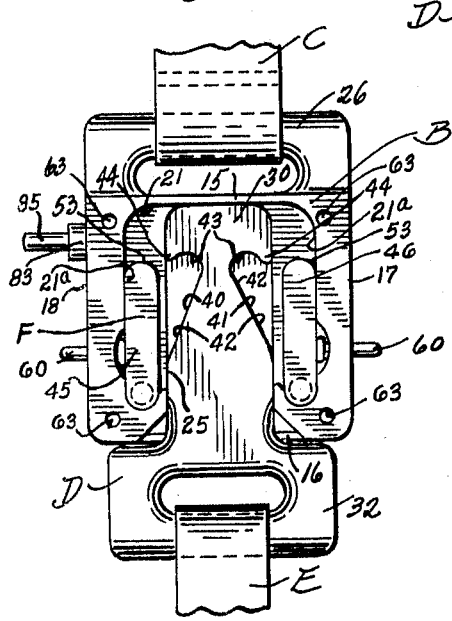
Fig. 4.
Fig. 5.
INVENTOR
Kevin H. Knowles.
BY Rommel, Allure any Rommel
ATTORNEYS May 3, 1966   K. H. KNOWLES   3,249,328
DELAYED ACTION COUPLING DEVICE FOR PARACHUTES
Filed May 26, 1964   2 Sheets-Sheet 2
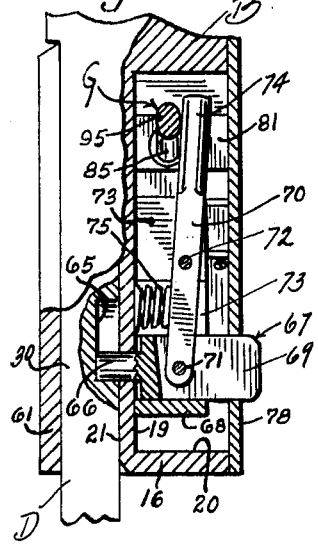
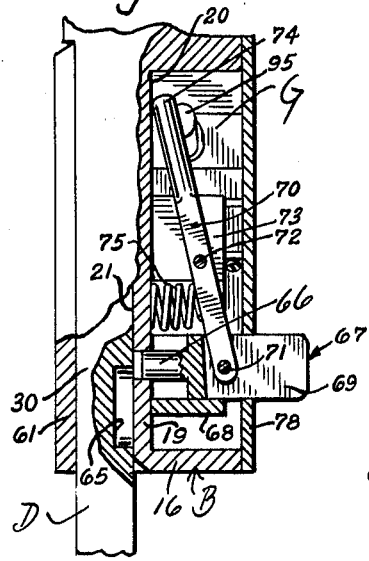
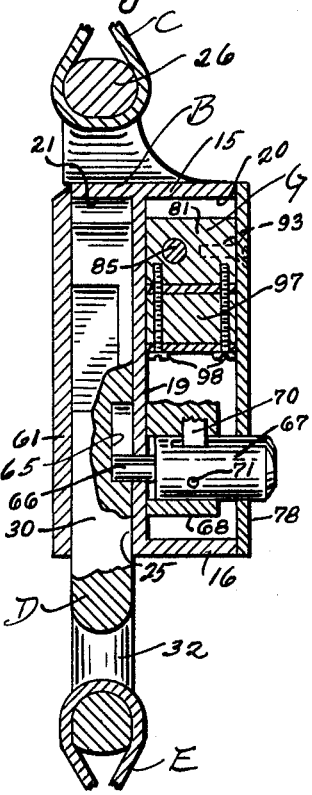
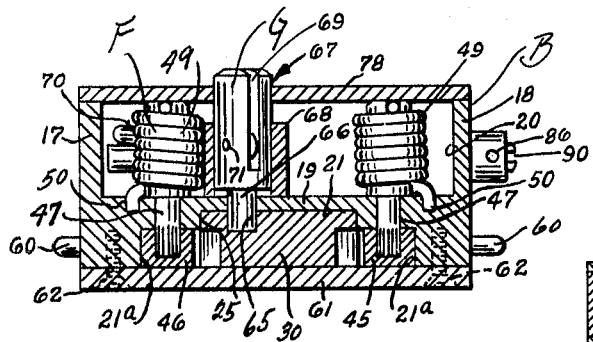
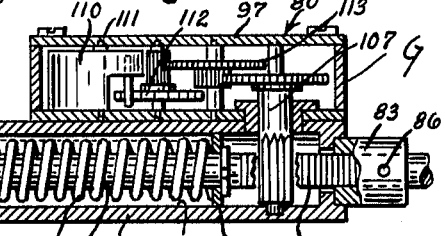
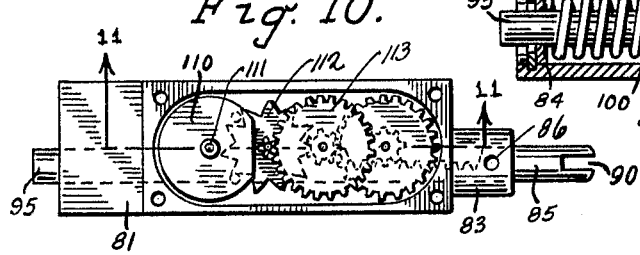
INVENTOR
Kevin H. Knowles.
BY
Rommel, Allwine Rommel
ATTORNEYS

United States Patent Office 3,249,328
Patented May 3, 1966

3,249,328
DELAYED ACTION COUPLING DEVICE FOR PARACHUTES
Kevin H. Knowles, Orinda, Calif., assignor to Irving Air Chute Company, Inc., Lexington, Ky., a corporation of New York
Filed May 26, 1964, Ser. No. 370,174
8 Claims. (Cl. 244—151)

This invention relates to an improved delayed action coupling device for releasably securing a trailing parachute canopy to a load.

The primary object of this invention is the provision of a ground release coupling adapted to be used with parachutes for releasably securing personnel and loads to parachute canopies. It is relatively simple and compact in construction requiring no loading tools in order to manipulate the connection of the parachute to the load. It has associated therewith a delayed action detent mechanism which will maintain the load connected to the parachute to prevent inadvertent release as a result of "pumping" such as occurs when the supporting webbing of a parachute is relaxed at the time of initial canopy inflation.

A further object of this invention is the provision of an accurately functioning delayed action device for releasably securing loads to parachutes and which will release the load at the time of ground contact.

A further object of this invention is the provision of a delayed action device for a parachute adapted to sustain cargo and personnel, which includes means to lock the mechanism prior to the moment of launching the parachute canopy; thus guarding against premature release during loading and ground handling operations.

Other objects and advantages of this invention will be apparent during the course of the following detailed description, taken in connection with the accompanying drawings, forming a part of this specification and wherein similar reference characters designate corresponding parts throughout the several views:

FIGURE 1 is a fragmentary perspective view showing the delayed action ground impact release coupling with a load attached connector secured thereto and showing the main riser webbing of the parachute canopy and static line adapted to set the delayed action device into operation at the time of canopy launching.

FIGURE 2 is a side elevation of the assembly shown in FIG. 1.

FIGURE 3 is a front elevational view of the device showing the manner in which a detent means holds the load connected slide coupling part in position during parachute descent; this view showing one of the face plates of the casing removed.

FIGURE 4 is a view similar to that of FIG. 3 but with the slide connector in the position it will assume upon ground impact of a load in order to permit the detent means to release the connector whereby to separate the canopy from the load at the immediate time of impact.

FIGURE 5 is a view of the device taken from the opposite side to that shown in FIG. 3, with its face plate removed and more particularly showing the delayed action detent assembly and other parts.

FIGURE 6 is a cross sectional view taken substantially on the line 6—6 of FIG. 5, showing the device loaded with the detent means of the delayed action device holding the load connector or coupling part attached to the casing in a non-releasable position.

FIGURE 7 is a cross sectional view of the parts shown in FIG. 6, but with the detent means of the delayed action device tripped to enable release of the load connector from the device at the time of load ground impact.

FIGURE 8 is a cross sectional view taken substantially on the line 8—8 of FIG. 5 showing detent arm actuating springs and a detent of the delayed action device.

FIGURE 9 is a cross sectional view taken through the device substantially on the line 9—9 of FIG. 5, showing the delayed action detent and its relation to the coupling slide.

FIGURE 10 shows the timer structure of the delayed action device.

FIGURE 11 is a cross sectional view of the timer structure taken substantially on the line 11—11 of FIG. 10.

In the drawings wherein for the purpose of illustration is shown a preferred embodiment of the invention, the letter A may generally designate the delayed action device which includes a casing structure B, to which a canopy attached riser web C is adapted to be attached. The device includes a slide connector or coupling member D, to which the load is adapted to be connected, although the parts may be rearranged so that the load is connected to the main casing and the parachute canopy to the connector D, if desired. Load attaching cable means or webbing E is usually attached to the slide connector D. Slide connector detent means F is provided for attaching the connector D in releasable position in the casing so that upon ground impact the load will be quickly released. A delayed action detent means G is provided as a safety feature to maintain the slide in proper load connected relation until the canopy has become fully inflated, thus preventing accidental release of the load such as sometimes occurs with conventional cargo hooks during pumping action of the canopy.

Referring to the casing structure B, the same may be made of any approved material, preferably light strong metal, and it is somewhat polygonal in formation, including a top wall 15, bottom wall 16 and opposed side walls 17 and 18. An intermediate partition wall 19 is provided connected to the top, bottom and side walls dividing the main body of the casing into a front compartment 20, and a rear compartment 21; the compartment 20 being adapted to receive details of the delayed action timer and detent means G and the compartment 21 being mainly adapted to receive the detent means F. The compartment 21 has a narrow passageway 25 to slidably receive the coupling connector D therein against lateral movement.

The top wall 15 of the casing is provided with a connector ring or handle 26 to which the canopy attached riser web C is connected.

The slide coupling or connector part D comprises an inverted T-shaped body including a tongue 30 of width to slidably rest in the narrow passageway 25 of the compartment 21 without liability of lateral rocking. In other words, it pursues a lineal path of movement. The passageway 25 is open at the bottom wall 16 to permit detachment of the slide coupling D upon ground impact of the load. The latter is provided with an attaching ring or connection 32 to which the webbing or cable E which supports the personnel or load is attached in any well known manner. From its rear side shown in FIG. 4, the tongue 30 is recessed at 40 and 41 for the major thickness thereof. These obliquely positioned recesses 40 and 41 are relatively upward convergent and have inner side surfaces 42 terminating at their upper ends in sockets 43 which are closed off by lateral lips 44. That is, the recesses 40 and 41 extend upwardly into the tongue 30 beyond the lips 44 for cooperation with the detent means F to be subsequently described.

It will be noted that the casing passageway 25 (see FIG. 8) is deeper than the lateral sides of the compartment 21. The shallow locations 21ª of the compartment 21 are adapted to receive similar movable detents 45 and 46. They each consist of an elongated arm which at its lower end is rib connected to shaft or pin 47, as shown in FIG. 8. The shafts or pins 47 bear in the intermediate partition wall 19 of the casing structure and they extend through and into the delayed action timer compartment 20. They are provided with biasing coiled springs 49 on the outer ends thereof in compartment 20. The pivot pins 47 are kerfed at their outer ends to receive the adjacent ends of springs 49. The lower ends of the springs are attached as shown at 50 to the casing structure. These springs are under tension to normally urge the detents 45 into the release position shown in FIG. 4.

It will be noted that the lower ends of the detents 45 and 46 are pivoted and that the upper ends swing laterally inwardly into the recesses 40 and 41 of the tongue. The upper ends of the detents 45 and 46 are rounded as shown at 53 to engage in the sockets 43 of the slide coupling D. It will be readily understood from FIG. 3 that when a load is attached to the webbing E and the detents 45 and 46 are in the position shown in FIG. 3, the load will maintain the detents 45 and 46 in the holding position notwithstanding the action of the basing springs 49 because the upper ends of the detents 45 and 46 are socketed at 43 and the lips 44 retain them against lateral displacement.

Since FIG. 4 shows the release position of the detents 45 and 46, some means must be provided to cock the detents. This can be done in any of a variety of ways. One form is shown in FIG. 3 consisting of cocking pins or plungers 60 slidably mounted on the side walls of the casing in position so that when they are pressed inward they will move the detents 45 and 46 (assuming the parts are assembled as shown in FIG. 3) into the recesses or grooves 42, tensioning the springs 49 so that when the load is applied the tongue will move to the position shown in FIG. 3 and the detents 45 and 46 will support the coupling member D in the position shown in FIG. 3. A closure or face plate 61 for the rear compartment 21 is attached by means of countersunk head bolts 62 to the casing body in openings 63.

Referring to the delayed action detent means G, the same is located in the front compartment 20 of the casing D. It will be noted that the slide coupling or connector on the rear surface thereof is provided with a slot 65 (see FIGS. 3, 6, 7, 8 and 9) adapted to receive the reduced end 66 of a resetting detent plunger 67 which is slidably mounted in a collar 68 secured to the partition wall 19. This detent plunger is longitudinally slotted at 69 as shown in FIGS. 6 and 7 for receiving an end of a lever 70 which is pivoted to the detent 67 at 71. The lever 70 is pivotally mounted intermediate its ends at 72 on wall 73 extending from the collar 68 and rigid therewith. The free end 74 of the lever 70 is rounded or cylindrical or oval shaped in cross section. The lever 70 is spring biased at 75, as shown in FIGS. 6 and 7 and normally urged at its free end into an outward position, as shown in FIG. 6, in the direction of the closure face plate 78. The latter is attached to and is part of the casing B for closing the front compartment 20.

The delayed action detent means G further includes a timer mechanism 80 detailed in FIGS. 10 and 11, which includes a casing portion 81 having an elongated compartment 82 therein. The compartment 82 is provided with a polymer of tetrafluoroethylene bushings 83 and 84 known as "Teflon" (a trademark) secured in place on timer 80 for slidably supporting a rack bar or member 85. The bearing 83 is provided with a retaining pin opening 86 therein, for a purpose to be subsequently described.

The rack bar 85 is provided with rack teeth 87 thereon, and its outer end is slotted at 90, as shown in FIGS. 2 and 10 to receive a retaining pin 92 for the purpose of holding the detent bar 85 in a cocked position.

The casing 81 is attached to the face plate 78 by bolts 93, such as shown in FIGS. 1 and 9, operating in tapped openings 94 (see FIG. 5) of the casing 81 to support the same in the compartment 20. It will be noted that the "Teflon" (a trademark) bushing 83 extends through an opening in a side wall 18 of the casing B.

The rack bar 85 is under control of timing mechanism mounted in a casing portion 97, attached at 98 by bolts to the casing 81.

The rack bar 85 slides along the passageway of the casing 81 and at the end 95 the same is intended when the device is cocked to hold the lever 70 in the position shown in FIG. 6, and in which position the detent member 67 will prevent the slide connector D from detaching from the casing B.

The delayed action timer device G is provided with a spiral compression spring 100 therein operating against a disc 101 secured to the rack bar and its opposite end engages bushing 84. It is normally under compression to urge the rack bar outwardly from the bushing 83. The outward position is illustrated in FIG. 11.

The timing details of the device G preferably consists of a rack bar engaging gear shaft 107 which is rotatably mounted at its ends upon the walls of the casings 81 and 97. The teeth of the shaft 107 mesh with the rack bar teeth 87 as shown in FIG. 11. A weighted governor 110 is pivoted at 111 in the casing 97 and between the same and the shaft 107 there is located an escapement 112 and timing gearing 113.

During operation, with the equipment shown in FIG. 1, the riser web C is slack at the coupling and it has attached thereto a shorter nylon static line 115 to which the retaining pin 92 is connected. The pin 92 holds the coupling rack bar cocked. When it is withdrawn the spring 100 will set the timer in actuation for the purpose of withdrawing the outer end 95 and removing the rack bar from its obstructing position with respect to the lever 70 of detent 67. When the rack bar reaches the position shown in FIG. 11 it will have passed the position which holds the pivoted lever 70, as shown in FIG. 6, and the spring 75 will then move the pivoted lever 70 to the position shown in FIG. 7 and free the detent 67 from the slide D. When the load hits the ground and is no longer supported by the connecting coupling device the springs 49 cam the detents 45 and 46 to the position shown in FIG. 4 and thus the load is in position to be released from positive connection with the parachute canopy.

The side plate 78 is secured by bolts 110 to the casing in tapped openings 111.

If the canopy starts a "pumping" action, it will do so before the delayed action detent means G is operated to release the connector D from the casing B. Upon load ground impact the connector D will assume the position shown in FIG. 4 and the detents 45 and 46 will immediately be urged by their springs 49 to the position shown in FIG. 4 and release the load from the canopy.

No loading tools are necessary. To load, the connector D is inserted into the slideway 25. The detents 45 and 46 are manipulated by the cocking pins 60 until they can assume a position such as shown in FIG. 3. The detent 67 is depressed and inserted into slot 65. This raises lever 70 to the position shown in FIG. 6. The timer is self-loading merely by pressing the rack bar into its casing 81. The retaining pin 92 is applied to hold the rack bar in cocked position.

It will be noted from FIG. 5 that with the end 66 of the detent 67 in the slot 65, the slide D cannot be raised to release the detents 45 and 46. They can only be released after the detent end 66 has been moved by the timer to the position shown in FIG. 7.

Various changes in the size, shape and arrangement of parts may be made to the form of invention herein shown and described without departing from the spirit of the invention or scope of the claims.

I claim:

1. In a coupling device for releasably securing a trailing parachute to an aerially launched load, the combination of a parachute attachable casing having a passageway therethrough provided with a lower opening upon the casing, a load coupling member having a tongue for releasable sliding insertion into said passageway, said coupling tongue having lateral recesses sloping in a relative upward convergent relation, detent members pivotally mounted on the casing at opposite sides of the tongue for lateral convergent movement into said recesses of the coupling tongue, said coupling tongue recesses at their most proximate ends being provided with lateral lips to normally hold the elongated detent members against release from the recesses of the tongue under the influence of a load attached to said coupling member, and spring means normally biasing said detent members to releasing positions.

2. In a delayed action device for releasably securing a trailing parachute to an aerially launched load, the combination of a casing for attachment to the parachute having a passageway therein with a bottom opening on the casing, a coupling member having a tongue for releasable insertion into said passageway, detent means mounted on the casing for releasably engaging said coupling tongue to prevent withdrawal of the coupling tongue from said passageway, spring basing means normally urging said detent means to a releasing relation with respect to said tongue, a detent member movably mounted on said casing, said coupling tongue having a recess for releasably receiving said detent member, and static line controlled timer means to operate said detent member and maintain it upon the casing in tongue holding relation until a predetermined time after launching of a load.

3. The device of claim 1 having means mounted on said casing with external portions to move said detent members into locking relation with the recesses of said tongue against the bias on said detent members.

4. In a delayed action device for releasably securing a trailing parachute to an aerially launched load, the combination of a supporting casing, a coupling member, releasable detent means for holding the coupling member attached to the casing, spring biasing means normally urging said detent means to a coupling releasing position, means on the coupling to socket the detent means therein against release of the coupling when a load is attached thereto, said coupling being so movably related to the casing that upon ground impact and support of the load the biasing means will move the detent means to a coupling releasing position, timer actuated detent means carried by the casing to engage and prevent movement of the coupling member to releasing position for a predetermined time after a launching operation, said timer actuated detent means including a detent plunger movably mounted upon the casing, a lever pivotally mounted upon the casing having a pivotal connection at one end with said detent, timing means including a cocking member movable to a restraining position for holding said lever with its connected detent into engaging relation with the coupling member to limit the movement thereof, and static line means for operating the timer member out of cocking relation to the lever.

5. In a delayed action device for releasably securing a trailing parachute to an aerially launched load, the combination of a supporting casing, means for connecting the supporting casing to a parachute canopy, said supporting casing having a passageway therein, a load connectable coupling member having a tongue slidably movable in said passageway, detent means on the casing to releasably hold the coupling member tongue connected to said casing under the force of a load supported by said coupling member, biasing means normally urging said detent means to a coupling member releasing position, a detent plunger slidably mounted upon said casing, said coupling member having means thereon to cooperate with the detent plunger to limit the movement of the coupling member to a non-releasing position, with respect to the casing, a timer including a cocking member movable thereon, means to set the timer in operation, and means connected to said detent member engageable with said cocking member of the timer to hold said detent member in a coupling member retaining position upon said casing until the timer has moved the cocking member to an uncocked position.

6. The delayed action device of claim 5 in which said timer actuated detent plunger has a detent end, and said coupling member has a recess therein into which the end engages to prevent removal of the coupling member from said casing, a lever pivoted between its ends on the casing having a pivotal connection at one end with said detent member, spring means normally biasing said lever to throw said detent member to a releasing position with respect to said coupling member, said lever having an end opposite the detent member normally cooperating with the cocking member of the timer to hold the detent member in a locking relation with respect to said coupling member until a predetermined time after the timer has been set into operation.

7. In a delayed action device for releasably securing a supporting parachute to an aerially launched load, the combination of a supporting casing having a passageway therein which opens downwardly on the casing, a load supporting coupling member adapted to support a load and of a size to be releasably slipped upwardly into the passageway through the bottom opening, a pair of elongated detents pivoted at their lower ends on said casing at opposite sides of the coupling member, the latter having opposite recesses therein adapted to receive the upper ends of said elongated detents, said coupling member having lips at the upper ends of said recesses to define sockets facing the recesses in which the extreme upper ends of the detents rest to support the coupling member upon said casing, spring means normally biasing each of said detents to move them to an inoperative position with respect to said recesses, said passageway being of a length which will permit the movement of the coupling member upwardly into the passageway from its position supported by the detents in order to release the detents from said recesses, a third detent for holding said coupling member against removal from the passageway of the casing, and timer control means for controlling the third detent including biasing means to remove the third detent from its holding position upon the coupling member after a predetermined release operation of the timing means.

8. A delayed action device as described in claim 7 in which the third detent comprises a reciprocating member, a pivoted member mounted on the casing for operating said reciprocating member, spring biasing means normally urging the pivoted member to a position for release of the third detent, said timer control means in cocked position normally holding said pivoted member for compressing said biasing means of the third detent.

References Cited by the Examiner
UNITED STATES PATENTS 2,919,154  12/1959  Schart _____ 294—83

MILTON BUCHLER, *Primary Examiner.*

ALFRED E. CORRIGAN, *Examiner.*